US012710346B2

(12) United States Patent
Sierro

(10) Patent No.: US 12,710,346 B2
(45) Date of Patent: Aug. 18, 2026

(54) SYSTEM AND METHOD FOR CONTROLLING TEMPERATURE OF A RHEOMETER OF VISCOMETER

(71) Applicant: Thermo Electron (Karlsruhe) GmbH, Karlsruhe (DE)

(72) Inventor: Philippe Sierro, Karlsruhe (DE)

(73) Assignee: Thermo Electron (Karlsruhe) GmbH, Karlsruhe (DE)

( * ) Notice: Subject to any disclaimer, the term of this patent is extended or adjusted under 35 U.S.C. 154(b) by 269 days.

(21) Appl. No.: 18/497,956

(22) Filed: Oct. 30, 2023

(65) Prior Publication Data

US 2024/0385095 A1 Nov. 21, 2024

(51) Int. Cl.
*G01N 11/10* (2006.01)
*G01N 11/00* (2006.01)

(52) U.S. Cl.
CPC ........ *G01N 11/10* (2013.01); *G01N 2011/002* (2013.01)

(58) Field of Classification Search
CPC ..... G01N 2011/002; G01N 2011/0013; G01N 11/10; G01N 11/14; G01N 11/142; G01N 11/16; G01N 11/162; G01N 11/165; G01N 11/167; G01N 2011/145; G01N 2011/147
See application file for complete search history.

(56) References Cited

U.S. PATENT DOCUMENTS 11,486,895 B2 * 11/2022 Yanai .................. G01R 1/0458
2024/0068920 A1 * 2/2024 Ishikawa ................ G01N 11/14

FOREIGN PATENT DOCUMENTS

JP 2013123053 A * 6/2013

* cited by examiner

*Primary Examiner* — Paul M. West
(74) *Attorney, Agent, or Firm* — Bo Wang

(57) ABSTRACT

The invention relates to methods and systems for temperature control, more specifically, a temperature control system for controlling sample temperature of a rheometer or viscosimeter. The temperature control system for a rheometer or a viscometer comprises a heater sub-unit comprising at least an electrical resistor heating element, a Peltier element sub-unit comprising at least a Peltier element; and a displacement system arranged to bring the Peltier element sub-unit into and out of contact with the heater sub-unit.

19 Claims, 6 Drawing Sheets

SYSTEM AND METHOD FOR CONTROLLING TEMPERATURE OF A RHEOMETER OF VISCOMETER

CROSS-REFERENCE TO RELATED APPLICATIONS

This application claims the benefit under 35 U.S.C. § 119(a) of German Application no. DE102023113121.4, filed on May 17, 2023. The entire contents of the aforementioned application are incorporated by reference herein.

TECHNICAL FIELD

The invention relates to methods and systems for temperature control, more specifically, a temperature control system of a rheometer or viscosimeter.

BACKGROUND

For measuring rheological properties (such as viscosity profiles) of a sample, rheometers or viscosimeters are used. Because rheological properties of a sample are often highly dependent on its temperature, it is important that a rheometer/viscometer has an accurate temperature control mechanism. This allows the dependency of the rheological properties on temperature to be measured and accounted for. Different temperature control mechanisms such as electrical resistors, heat exchangers and Peltier elements exist. However, these different systems have disadvantages. For example, a temperature control mechanism based on a Peltier element can control the temperature from −40° C. up to 160° C. However, the temperature control mechanisms based on the Peltier element typically fails to reach temperatures over 200° C. and deteriorates in performance if raised to high temperatures. Therefore, there is room for improvement in this area.

SUMMARY

According to a first aspect of the invention there is provided a temperature control system for a rheometer or a viscometer. The temperature control system comprises a heater sub-unit comprising at least an electrical resistor heating element, a Peltier element sub-unit comprising at least a Peltier element; and a displacement system arranged to bring the Peltier element sub-unit into and out of contact with the heater sub-unit.

There is further provided a system for measuring rheological properties of a sample. The system comprises an actuator; a measuring device arranged for measuring a force applied to the sample and a deformation of the sample; a rotor; a stator; and the temperature control system previously described. The actuator is configured to move the rotor relative to the stator for deforming the sample.

There is further provided a method of controlling the temperature of a sample for a rheometer or viscometer. The method comprises loading the sample to the rheometer or viscometer; adjusting a temperature of the sample with one or both of: heater sub-unit comprising at least an electrical resistor heating element; and a Peltier element sub-unit including at least a Peltier element; and responsive to a temperature of the Peltier element sub-unit, operating a displacement system to bring the Peltier element sub-unit into and out of contact with the heater sub-unit.

Using of the Peltier element sub-unit, the aforementioned temperature control system is able to provide fine tune temperature control of the sample in a low temperature range, typically from −40° C. up to 160° C. Using the heater sub-unit, the temperature control system can provide temperature control of the sample in a high temperature range, typically above 160° C., and up to 400° C. By use of the displacement system, it can be ensured that the Peltier element sub-unit is out of contact with the heater sub-unit when the sample is heated in the high temperature range, and so deterioration of the Peltier element can be avoided.

BRIEF DESCRIPTION OF THE DRAWINGS

For a better understanding of the invention, and to show how the same may be put into effect, reference will now be made, by way of example only, to the accompanying drawings, in which.

DETAILED DESCRIPTION

Figure 1:
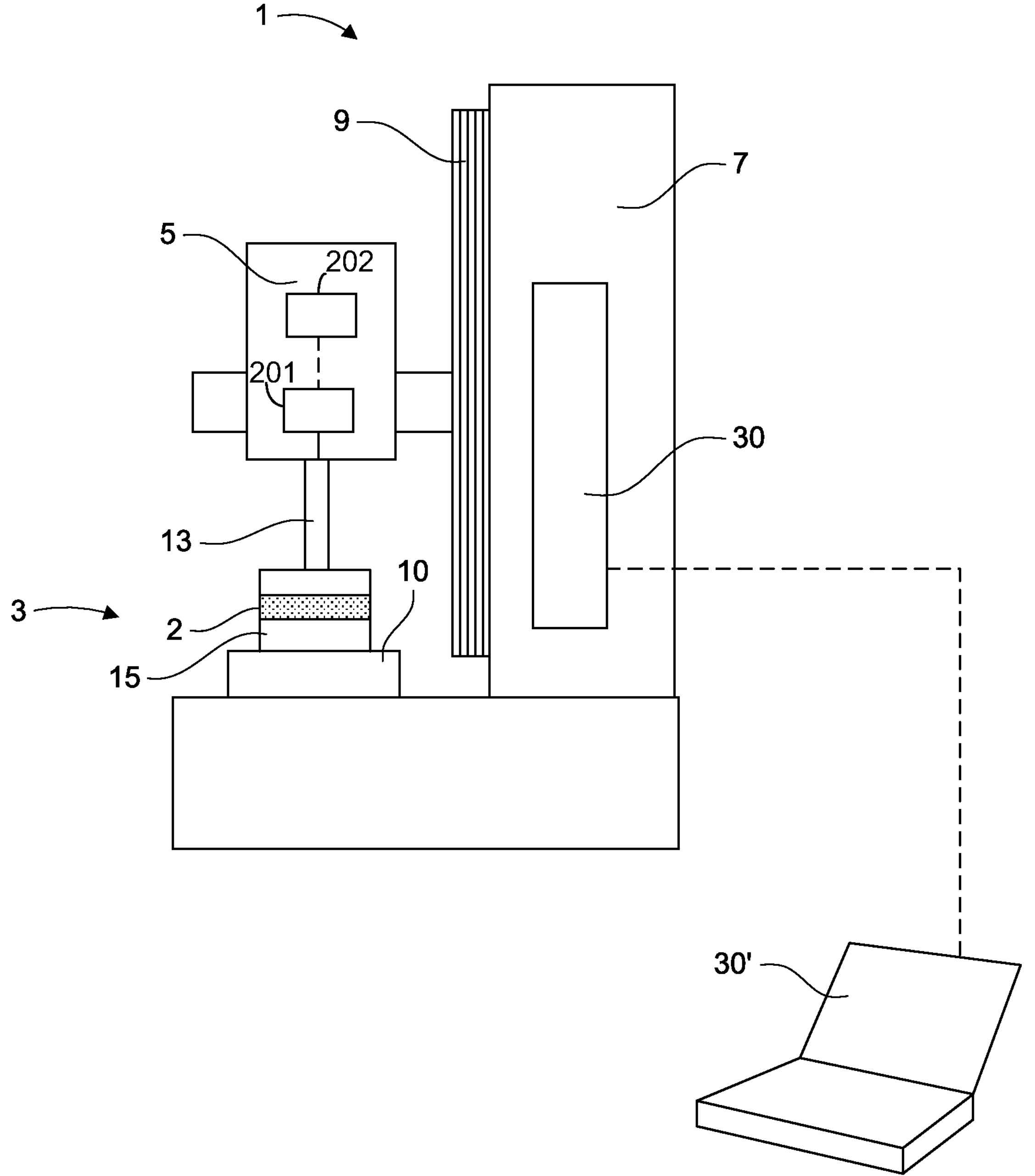
FIG. 1 shows a schematic of a viscosity measuring device.

FIG. 1 shows a schematic of a viscosity measuring device 1, such as a rheometer or a viscosimeter. In addition, a rheometer is used to measure the viscoelasticity properties of a material while a viscosimeter is more limited in performance and is used to measure the viscosity of the material. Rheological properties define the way a material's viscoelasticity changes as dependent of the applied stress and strain. In general, the viscosity measuring device 1 is used to measure the viscosity of a sample 2.

The viscosity measuring device 1 comprises a deformation actuator 201, a measuring device 202, and a measuring cell 3. In the illustrated embodiment, the deformation actuator 201 and the measuring device 202 are combined into a measuring head 5.

The deformation actuator 201 is configured to apply a force or a displacement to the sample 2. The deformation actuator 201 may be mechanically coupled to either a rotor or a stator. In use, the deformation actuator 201 applies a shear stress and/or a shear strain to the sample 2 which causes it to deform. The deformation actuator 201 may provide a rotational force or torque. For example, the deformation actuator 201 may be a motor applying a torque or an angular rotation which can cause at least a part of the sample 2 to rotate.

The measuring device 202 is configured to measure the force or the torque, and/or the displacement, for example an angular rotation, applied by the deformation actuator 201. The measuring device 202 may include one or more of a force sensor, a torque sensor and a displacement/rotation sensor. The force and/or the displacement generated by the deformation actuator 201 correspond to the resulting shear stress and/or shear strain of the sample 2, which further correspond to a geometrically controlled deformation of the sample 2. Both shear stress and shear strain are the basic measures which are used in the rheological equations for determining, for example, the viscosity. The measuring device 202 may comprise a plurality of separate measuring devices which independently measure different parameters but are collectively referred to as the measuring device 202. For example, one device may measure the force and/or torque applied by the deformation actuator 201, via the measure of the electrical current, and a second device may measure the resulting deformation of the sample 2 via the measure of an angular rotation.

In the illustrated embodiment, the measuring head 5 is arranged to provide a movement, such as a rotation, to the sample 2 via the measuring cell 3 and measure the applied force and resulting deformation. Therefore, the measuring head 5 comprises both the deformation actuator 201 and the measuring device 202. The measuring cell comprises a rotor 13 and a stator 15.

The viscosity measuring device 1 may also comprise a chassis 7 and a lift 9. The chassis 7, in combination with the lift 9 is present to hold the measuring head 5 in position relative to the sample 2. The measuring head 5, which may drive the rotor 13, may be held in a known and exact position to ensure a defined distance between the rotor 13 and the stator 15, so that a gap in which the sample is placed is well defined so that it is able to measure the exact deformation of the sample 2. The lift 9 allows the measuring head 5, with the rotor 13, to be raised and lowered relative to the stator 15 such that the gap for the sample 2 can be altered to accommodate different types and volumes of samples. The lift 9 also allows the sample 2 to be clamped in place.

The viscosity measuring device 1 further comprises a temperature control system 10 for controlling the sample temperature. In use, the sample 2 which is being analysed is held between the rotor 13 and the stator 15, and the rotor 13 and stator 15 are configured to hold and deform the sample 2 therebetween. The rotor 13 and stator 15 may be configured to hold and deform the sample 2 in the defined gap between the rotor and the stator. Although the stator 15 and the temperature control system 10 are shown as distinct parts in FIG. 1, they may be integrally formed. For example, the stator 15 may be the upper surface of the temperature control system 10.

The rotor 13 is mechanically coupled to the deformation actuator 201, such that the deformation actuator 201 can move the rotor to deform the sample 2. In the illustrated embodiment, the rotor 13 is connected to the measuring head 5, which comprises the actuator. The deformation actuator 201 is configured to move the rotor 13 relative to the stator 15. In other words, the rotor 13 is movable and the stator 15 is held still. The preferred movement for the rotor 13 is rotation, but additional types of movement are possible, such as oscillation, which would also cause deformation which could then be measured. In some embodiments, position of the rotor 13 and stator 15 may be swapped. That is, the stator 15 is positioned on top of the sample 2, and the rotor 13 is positioned below the sample 2.

In use, the sample 2 is held between and in direct contact with each of the rotor 13 and the stator 15. For example, a first surface of the sample 2 is held stationary relative to the rotor 13 and a second surface of the sample 2 is held stationary relative to the stator 15. The first sample surface is preferably opposite to the second surface. The surfaces of the sample 2 may be held still relative to the rotor 13 and stator 15 by frictional/adhesion interfaces. Alternatively, the rotor 13 and stator 15 may be bonded to the sample surfaces in some way. Holding the surfaces of the sample 2 still relative to the rotor 13 and stator 15 results in the sample 2 being deformed when the rotor 13 moves relative to the stator 15.

FIG. 1 shows the temperature control system 10 coupled to the stator 15. In some embodiments, the temperature control system 10 may alternatively or additionally be coupled to the rotor 13. In one example, the temperature control system 10 disclosed herein may form a part of a hood that is thermally coupled with the rotor 13.

Figure 2:
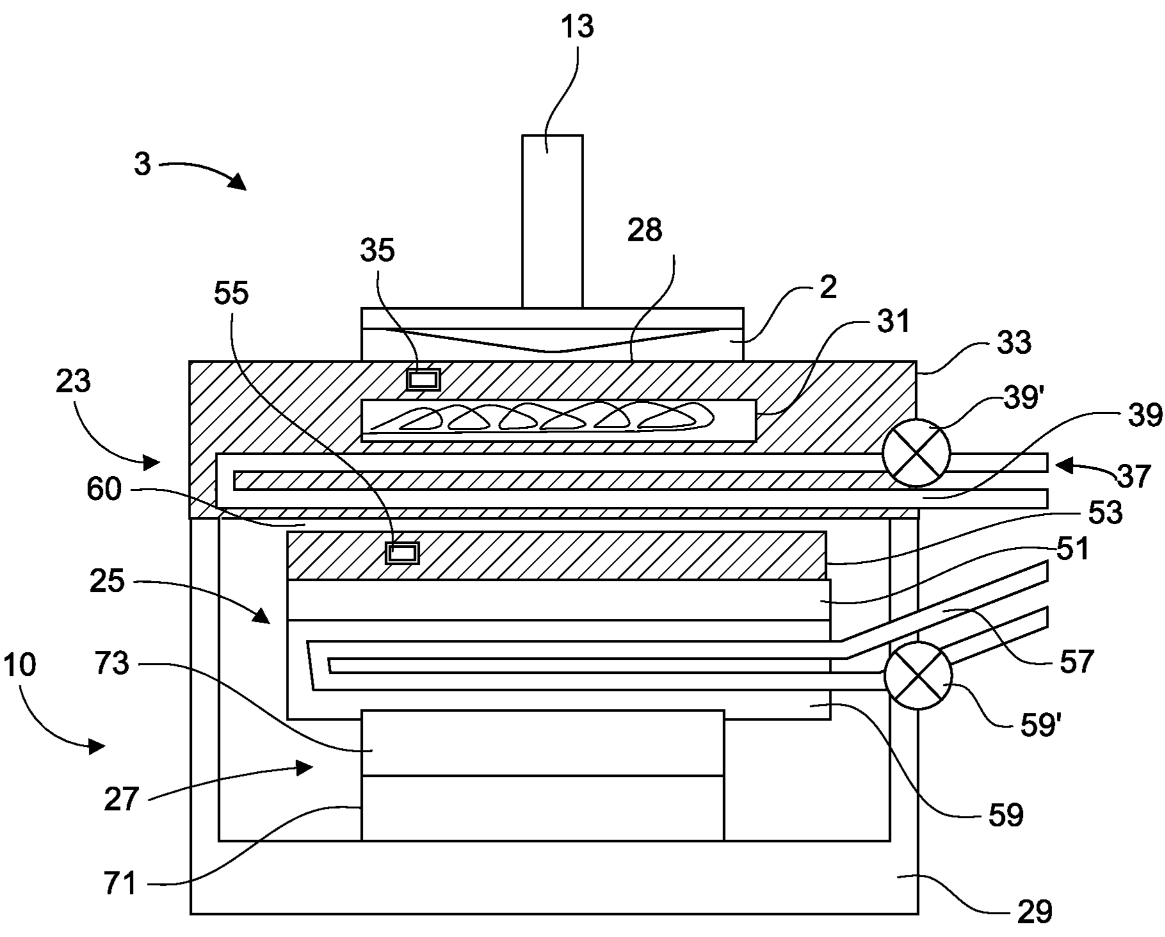
FIG. 2 shows a measuring cell, comprising a temperature control system, of the viscosity measuring device of FIG. 1 according to the present invention, wherein the temperature control system is in a first position.
Figure 3:
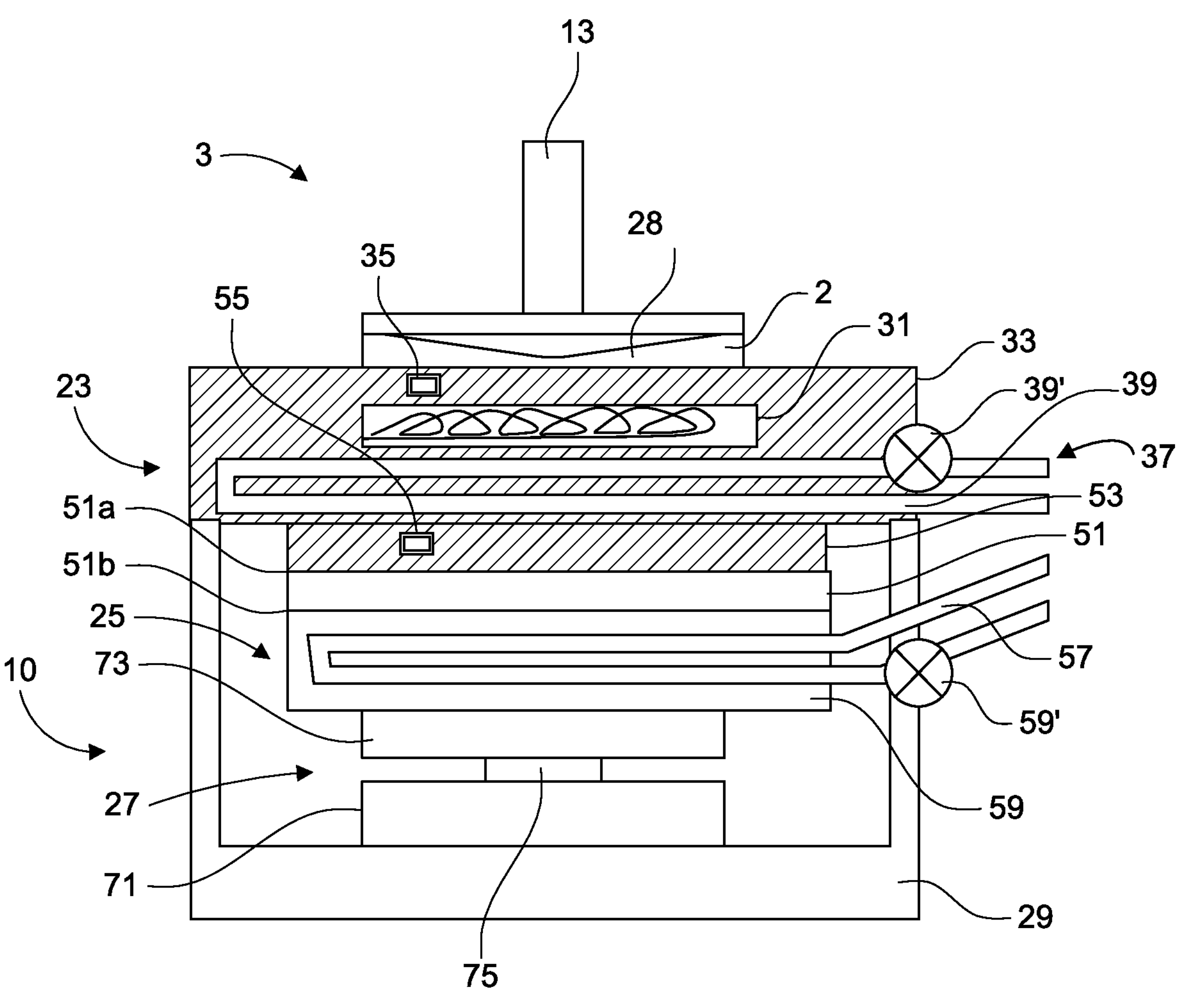
FIG. 3 shows the measuring cell of FIG. 2, wherein the measuring cell is in second position.

Turning to FIGS. 2 and 3 which shows the measuring cell 3 and the temperature control system 10 in more detail. The temperature control system 10 comprises a heater sub-unit 23, a Peltier element sub-unit 25 and a displacement system 27.

In the illustrated embodiment, a sample supporting surface 28 of the temperature control system 10, and of the heater sub-unit 23 in particular, acts as the stator 15. The sample supporting surface 28 may also be referred to as a first surface 28 of the of the heater sub-unit 23. In other words, in use, the sample 2 is in contact with the sample supporting surface 28 of the temperature control system 10. Contacting the sample 2 directly with the sample supporting surface 28 of the temperature control system 10 allows for easier heat transfer between the temperature control system 10 and the sample 2. In some embodiments, an independent stator 15 may be present in between the temperature control system 10 and the sample 2 for conducting heat therebetween. The independent stator 15 between the temperature control system 10 and the sample 2 can protect the temperature control system 10 from abrasion due to the sample 2.

As shown in the illustrated embodiment, the temperature control system 10 may further comprise a housing 29 for supporting the heater sub-unit 23. The heater sub-unit 23 is held stationary relative to the housing 29. This is achieved by the heater sub-unit 23 affixed on top of the housing 29 in the illustrated embodiment. The Peltier element sub-unit 25 and the displacement system 27 may be enclosed within the housing 29. The Peltier element sub-unit 25 is moveable by the displacement system 27 relative to the housing 29. This allows the displacement system 27 to move the Peltier element sub-unit 25 relative to the heater sub-unit 23.

The temperature control system 10 also comprises a controller 30 (shown in FIG. 1). The controller 30 includes a processor and a non-transitory memory for storing computer readable instructions. By executing the computer readable instructions with the processor, the controller 30 is arranged to control one or more of the heater sub-unit 23, the Peltier element sub-unit 25, the displacement system 27, and the deformation actuator 201, as described herein below. In addition, the controller 30 is arranged to receive data from the temperature sensors 35, 55, as well as measuring device 202, as a control input. The controller 30 can use the data from the temperature sensors 35, 55 as feedback in controlling the temperature of the sample 2. Optionally, the controller 30 may be replaced by, or controlled by, an external processing device (for example, a laptop) 30' as shown via a wired or wireless connection for operating the temperature control system 10.

Turning to the components of the temperature control system 10 in more detail, the heater sub-unit 23 comprises an electrical resistor heating element 31 such as a wire which heats up when an electric current is passed therethrough. The electrical resistor heating element 31 heats up quickly upon being subject to an electric current and can provide temperatures of up to and/or in excess of 400° C. Optionally, the heater sub-unit 23 may comprise a plurality of electrical resistor heating elements 31.

The heater sub-unit 23 further comprises a first thermally conductive material 33 which conducts heat from the electrical resistor heating element 31 to the sample 2. A top surface of the first thermally conductive material 33 forms the sample supporting surface 28. Alternatively, the electrical resistor heating element 31 could be situated at the surface of the heater sub-unit 23 such that it provides heat directly to the sample 2. However, the first thermally conductive material 33 allows other components to directly influence the temperature of the sample 2, in addition to the heater sub-unit 23. As illustrated, the first thermally conductive material 33 may entirely surround the electrical resistor heating element 31 such that the top and bottom surfaces of the heater sub-unit 23 is formed by the first thermally conductive material 33.

The heater sub-unit 23 preferably further comprises a heater temperature sensor 35 which is arranged to measure the temperature of at least a part of the heater sub-unit 23 such as the first thermally conductive material 33 of the heater sub-unit 23. Preferably, the temperature sensor 35 may be embedded within the first thermally conductive material 33. The heater temperature sensor 35 may be situated in proximity to the sample supporting surface 28 and therefore the sample 2. In general, the heater temperature sensor 35 can be used to measure the temperature of the sample 2. In some examples, the sample temperature may be measured by the temperature sensor 35.

The heater sub-unit 23 further comprises a heater heat exchanger 37 which is for controlling the temperature of at least a part of the heater sub-unit 23, such as the first thermally conductive material 33. The heater heat exchanger 37 preferably comprises a conduit 39 for carrying heat exchanger fluid through the first thermally conductive material 33 and also comprises a conduit valve 39' for controlling the flow of heat exchanger fluid through the conduit 39. The heat exchanger fluid may be liquid or gas. As illustrated, the conduit 39 is positioned between the electrical resistor heating element 31 and the Peltier element sub-unit 25. Alternatively, the conduit 39 could be arranged on the side of the heater sub-unit 23, or between the electrical resistor heating element 31 and the sample supporting surface 28 since these positions would also allow the heater heat exchanger 37 to cool the first thermally conductive material 33. Positioning the conduit 39 between the electrical resistor heating element 31 and the sample supporting surface 28 may negatively affect performance, unless gas is used as the heat exchanger fluid.

Figure 4:
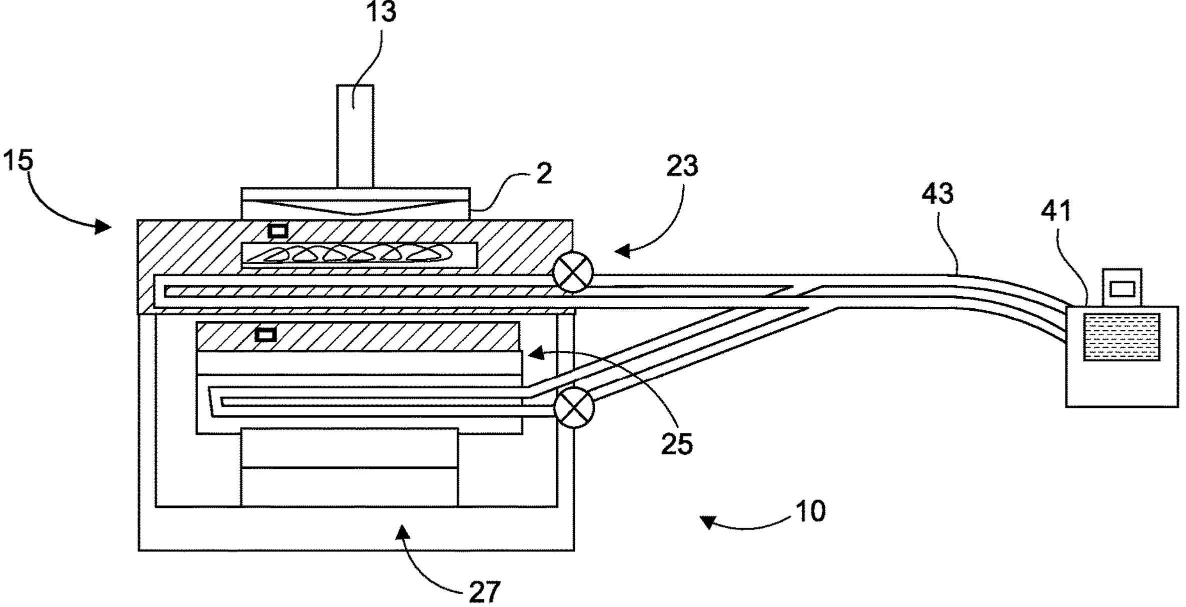
FIG. 4 shows the measuring cell of FIG. 2 and a heat exchanger sub-system.

As shown in FIG. 4, the conduit 39 is connected to an external heat exchanger 41 via heat exchange fluid pipes 43. The external heat exchanger 41 is used to regulate the temperature of the heat exchanger fluid and thereby the first thermally conductive material 33. The heater heat exchanger 37 can be used to reduce the temperature of the sample 2 when it is desired to cool the sample 2. This is especially important when the Peltier element sub-unit 25 is not being used to cool the sample.

The Peltier element sub-unit 25 comprises a Peltier element 51, which is a solid-state active heat pump able to transfer heat from one side of the device to the other, using electrical energy. Such an instrument is also called a Peltier device, Peltier heat pump, solid state refrigerator, or thermoelectric cooler (TEC). The Peltier element 51 operates via the Peltier effect. The direction the Peltier element 51 transfers heat is dependent on the direction of an electric current supplied to the Peltier element 51. The Peltier element 51 comprises a sample side 51*a* for conducting heat to or from the sample 2 and a secondary side 51*b* for drawing or rejecting heat. Therefore, the Peltier element 51 can be used to heat or cool the sample 2.

In preferred examples of a cooling mode, wherein the temperature of the sample side 51*a* is lower than the temperature of the secondary side 51*b*, the Peltier element 51 can maintain a temperature difference between the sample side 51*a* and the secondary side 51*b* of more than 50° C. For example, if the secondary side 51*b* is maintained at 10° C. the sample side 51*a* can reached temperatures of −40° C. In preferred examples of a heating mode, wherein the temperature of the sample side 51*a* is higher than the temperature of the secondary side 51*b*, (for example aided by the internal heat dissipation), the Peltier element 51 can maintain a temperature difference between the sample side 51*a* and the secondary side 51*b* of more than 100° C. For example, if the secondary side 51*b* is maintained at 100° C. the sample side 51*a* can reached 200° C. Since the Peltier element 51 can experience a deterioration of performance in temperatures near to 200° C., the secondary side 51*b* may be maintained at 60° C. and sample side 51*a* is therefore able to reach 160° C.

Therefore, by controlling the temperature of the secondary side 51*b* in a range of 10° C. to 60° C., a precise control of the temperature of the sample side 51*a* can be obtained in a temperature range typically from −40° C. to 160°. In addition, the Peltier element sub-unit 25 may comprise a plurality of the Peltier elements 51.

The Peltier element sub-unit 25 further comprises a second thermally conductive material 53 which conducts heat from the Peltier element 51 to the sample 2 and the second thermally conductive material 53 is in contact with the sample side 51*a* of the Peltier element 51. The second thermally conductive material 53 of the Peltier element sub-unit 25 is arranged to conduct heat from the sample side 51*a* of the Peltier element 51 to the first thermally conductive material 33 of the heater sub-unit 23 when the two sub-units 23, 25 are in contact. This allows heat transfer between the sample 2 and the Peltier element 51 via the first and second thermally conductive materials 53, 33, so that the Peltier element 51 can heat or cool the sample 2.

The Peltier element sub-unit 25 further comprises a Peltier element temperature sensor 55 which is arranged to measure the temperature of at least a part of the Peltier element sub-unit 25 such as the conductive material 55. The temperature sensor 55 may be embedded within the conductive material 53 and it can be used to monitor the temperature of the Peltier element 51. This can be used to ensure the Peltier element 51 is not heated above a temperature at which it will deteriorate. In addition, the Peltier element temperature sensor 55 can be used to measure the temperature of the sample 2 to provide further feedback in addition to the heater temperature sensor 35.

The Peltier element temperature sensor 55 can also provide feedback, for example for a control loop, to keep the Peltier element sub-unit 25 at a standby temperature when it is out of contact with the heater sub-unit 23. The standby temperature may be a maximum temperature at which the Peltier element 51 experiences no deterioration.

The Peltier element sub-unit 25 further comprises a Peltier element heat exchanger 59. The Peltier element heat exchanger 59 preferably comprises a conduit 57 for carrying heat exchanger fluid in proximity to the Peltier element 51, and preferable in proximity to the secondary side 51*b* of the Peltier element 51. As illustrated, the conduit 57 passes through a second conductor material which is in contact with the secondary side 51*b* of the Peltier element 51. As shown in FIG. 4, the conduit 57 may be connected to the external heat exchanger 41. The Peltier element heat exchanger 59 can be used to provide to or absorb heat from the secondary side 51*b* of the Peltier element 51. This aids the Peltier element 51 in providing heating or cooling to the sample 2 as desired. The Peltier element heat exchanger 59 also comprises a conduit valve 59' for controlling the flow of heat exchanger fluid through the conduit 57.

The heater heat exchanger 37, Peltier element heat exchanger 59 and external heat exchanger 41 may collectively form a heat exchanger sub-system. In addition, the conduit valves 39', 59' may be replaced with pumps so that active flow control is used to provide the temperature control via the heat exchanger sub-system. An alternate heat exchanger sub-system may be arranged to transfer excess heat to the ambient air using a heat exchanger with cooling fins and optionally a fan.

The displacement system 27 is arranged to move the Peltier element sub-unit 25 into and out of contact with the heater sub-unit 23. In particular, the displacement system 27 is arranged to bring the Peltier element sub-unit 25 into and out of contact with the first thermally conductive material 33 of the heater sub-unit 23. This allows the heater sub-unit 23 to heat the sample 2 to temperatures at which the Peltier element 51 would deteriorate without damaging the Peltier element 51, since the Peltier element sub-unit 25 can be out of contact from the heater sub-unit 23 at these temperatures. Contact between the Peltier element sub-unit 25 and the heater sub-unit 23 includes any arrangement of solid conductive bridges which allow heat energy to be transferred from the heater sub-unit 23 to the Peltier element sub-unit 25 along a solid conductive path. Therefore, the contact between the Peltier element sub-unit 25 and the heater sub-unit 23 may also be referred to as thermal coupling of the sub-units 23, 25. For example, if the heater sub-unit 23 is in contact with the sample 2 and the Peltier element sub-unit 25 is also in contact with the sample 2, the heater sub-unit 23 can be referred to as in contact with the Peltier element sub-unit 25 since heat can be transferred between the two, despite there being no direct physical contact between the heater sub-unit 23 and the Peltier element sub-unit 25. In other words, contact refers to a solid conductive path being present between the two sub-units 23, 25. Conversely, when the Peltier element sub-unit 25 is out of contact with the heater sub-unit 23, the sub-units are arranged such that no heat is conducted (or substantially no heat is transferred, i.e. heat transfer is negligible) from the heater sub-unit 23 to the Peltier element sub-unit 25 via a solid conductive path. This can also be referred to as thermal uncoupling of the sub-units 23, 25. The potential for heat transfer via the housing is to be ignored, since this is negligible.

Alternatively, the displacement system 27 may be arranged to move the Peltier element sub-unit 25 into and out of direct contact with the heater sub-unit 23. Direct contact may refer to physical contact between a portion of the Peltier element sub-unit 25 into and a portion of the heater sub-unit 23.

The displacement system 27 may be arranged to bring the Peltier element sub-unit 25 into and out of contact with the heater sub-unit 23 based on at least one or more of: a temperature of the Peltier element sub-unit 25; a temperature of the heater sub-unit 23; and a temperature of the sample 2. The aforementioned temperature may be the current or target temperature of the sample 2.

In the illustrated embodiment, the sub-units are arranged in series, meaning that the Peltier element sub-unit 25 is situated below the heater sub-unit 23 and the sample supporting surface 28 is at the top of the heater sub-unit 23, i.e., on the opposite side to where the Peltier element sub-unit 25 is situated. In this embodiment. The displacement system 27 raises the Peltier element sub-unit 25 to be in contact with the heater sub-unit 23 and lowers the Peltier element sub-unit 25 to be out of contact with the heater sub-unit 23.

In an alternative embodiment, the Peltier element sub-unit 25 could be situated to the side of the heater sub-unit 23. The Peltier element sub-unit 25 could then be brought into and out of contact with the heater sub-unit 23 by horizontal movement. In this embodiment, the sample supporting surface 28 at the top of the heater sub-unit 23 would merely be on a different side to where the Peltier element sub-unit 25 is situated, but not the opposite side. In other words, the sample supporting surface 28 at the top of the heater sub-unit 23 is not the opposite side to where the Peltier element sub-unit 25 is situated. Indeed, any arrangement is possible in which the sample supporting surface 28 of the heater sub-unit 23 is arranged to be proximal to the sample 2 and a second surface of the heater sub-unit 23, is arranged to be in contact with the Peltier element sub-unit 25.

The displacement system 27 may displace the heater sub-unit relative to the Peltier element sub-unit by actuating a displacement actuator or by thermal expansion/dilatation or contraction. The displacement actuator may include motor, a pneumatic actuator, a magnetic actuator, or a piezo actuator. In an alternative embodiment, the displacement system 27 may generate displacement by thermal expansion or contraction, also referred to as temperature dilatation, thereby allowing for a passive temperature-based control of the displacement system 27.

The displacement system 27 preferably comprises two base portions 71, 73 and an extendable displacement actuator 75 (shown in FIG. 3) therebetween. A first base portion 71 engages the housing 29 while a second base portion 73 engages the Peltier element sub-unit 25. The extendable displacement actuator 75 moves the second base portion 73 relative to the first base portion 71, and therefore can move the Peltier element sub-unit 25 away relative to the housing 29 and towards the heater sub-unit 23.

The displacement system 27 moves a part of the temperature control system 10 between an engaged position (shown in FIG. 3), and a disengaged position (shown in FIG. 2), as described herein below. The engaged position may also be referred to as a first position and the disengaged position may be referred to as a disengaged position.

As shown in FIG. 2, in the disengaged position the Peltier element sub-unit 25 is not in contact with the heater sub-unit 23. As a result, a gap 60, preferably an air gap, is present between the Peltier element sub-unit 25 and the heater sub-unit 23. The gap 60 may be any value above 0 mm, or above 0.1 mm. For example, the gap may be between 1 and 10 mm. In other words, the displacement system 27 is configured to separate the sub-units 23, 25—such that there is a gap of any value above 0 mm (for example, between 1 and 10 mm) between the heater sub-unit 23 and the Peltier element sub-unit 25. Therefore, the second thermally conductive material 53 of the Peltier element sub-unit 25 is not in contact with the first thermally conductive material 33 of the heater sub-unit 23 and heat is not able to transfer from the electrical resistor heating element 31 to the Peltier element 51. This ensures that the Peltier element 51 is not damaged by high temperatures. In the disengaged position, the Peltier element sub-unit 25 is not able to heat or cool the sample 2. Therefore, the controller 30 is arranged to control the displacement system 27 to ensure that the Peltier element sub-unit 25 is not in the disengaged position at low temperatures, where the Peltier element 51 provides better temperature control, as described below.

As shown in FIG. 3, in the engaged position the Peltier element sub-unit 25 is in contact with the heater sub-unit 23. The displacement system 27 is operated to move the Peltier element sub-unit 25 such that gap 60 is removed and the second thermally conductive material 53 of the Peltier element sub-unit 25 is in contact with the first thermally conductive material 33 of the heater sub-unit 23. This allows heat to be transferred from the sample 2 to and from the Peltier element 51, via the first and second thermally conductive materials 33, 53 of the two sub-units 23, 25. In the engaged position heat will also transfer from the electrical resistor heating element 31 to the Peltier element 51, which could cause deterioration of, or damage to, the Peltier element 51 when the temperature of the electrical resistor heating element 31 or the sample 2 is above a certain temperature. Therefore, the controller 30 is arranged to control the displacement system 27 to ensure that the Peltier element sub-unit 25 is not in the engaged position at high temperatures, where the Peltier element 51 could be damaged, as described below.

Although the illustrated embodiment shows the temperature control system 10 below and/or incorporated into the stator 15, an alternate embodiment could have the temperature control system 10 above and/or incorporated into the rotor 13. All features of the previous embodiment would apply except the orientation of the sub-units 23, 25 would be reversed.

A method of operating the temperature control system 10 is now described. In general, the method involves changing the temperature of the sample 2 and operating the displacement system 27 based on the temperature of the sample 2.

The temperature of the sample 2 is changed using the Peltier element sub-unit 25 and/or the heater sub-unit 23. For example, the Peltier element 51 can be used, in the engaged position, to supply heat to the sample 2 via the first and second thermally conductive materials 33, 53 of the sub-units 23, 25. In this case, heat energy is supplied to the Peltier element 51 by the Peltier element heat exchanger 59. The Peltier element 51 can also be used to remove heat from the sample 2 (via the first and second thermally conductive materials 33, 53), to cool the sample 2 down. In this case heat is rejected by the Peltier element 51 to the Peltier element heat exchanger 59.

The electrical resistor heating element 31 can also be used to supply heat to the sample 2, via the first thermally conductive material 33 of the heater sub-unit 23. The heater heat exchanger 37 can be used to remove heat from the sample 2, via the first thermally conductive material 33.

The displacement system 27 is operated based on the temperature of the sample 2 (which is preferably monitored using the temperature sensors 35, 55) as follows. There is a threshold temperature above which there is an increased risk of the Peltier element 51 deteriorating. The threshold temperature may be selected for a specific Peltier element 51 but will typically be in the range 150° C. to 200° C. depending on the Peltier manufacturer specifications. A beneficial threshold temperature may be in the range 150° C. to 160° C., because above this temperature range the Peltier elements lose performances in heating rate. When the sample 2 is heated at temperatures above a first threshold temperature (e.g., a temperature in the range 150° C.-160° C.), the controller 30 operates the displacement system 27 to place the temperature control system 10 in the disengaged position. This prevents the Peltier element 51 from deteriorating. When the sample 2 is heated or cooled at temperatures below a second threshold temperature (e.g., a temperature in the range 130° C.-140° C.), the controller 30 operates the displacement system 27 to place the temperature control system 10 in the engaged position. This allows the finer control of the Peltier element 51 to be used at temperatures below the second threshold temperature. The first threshold temperature may be higher than or equal to the second threshold temperature. By using different threshold temperatures for disengaging and engaging the heater sub-unit 23 and the Peltier element sub-unit 25, system hysteresis is taken into consideration and the damage to the Peltier element 51 may be further prevented.

As an alternative to monitoring the temperature of the sample 2 using the temperature sensors 35, 55, the temperature of the sample 2 (based on which the displacement system 27 is operated) may be estimated using one or more of: the current/voltage supplied to the electrical resistor heating element 31; the current/voltage supplied to the Peltier element 51; and the flow of the heat exchanger fluid in the heat exchanger sub-system.

Figure 5:
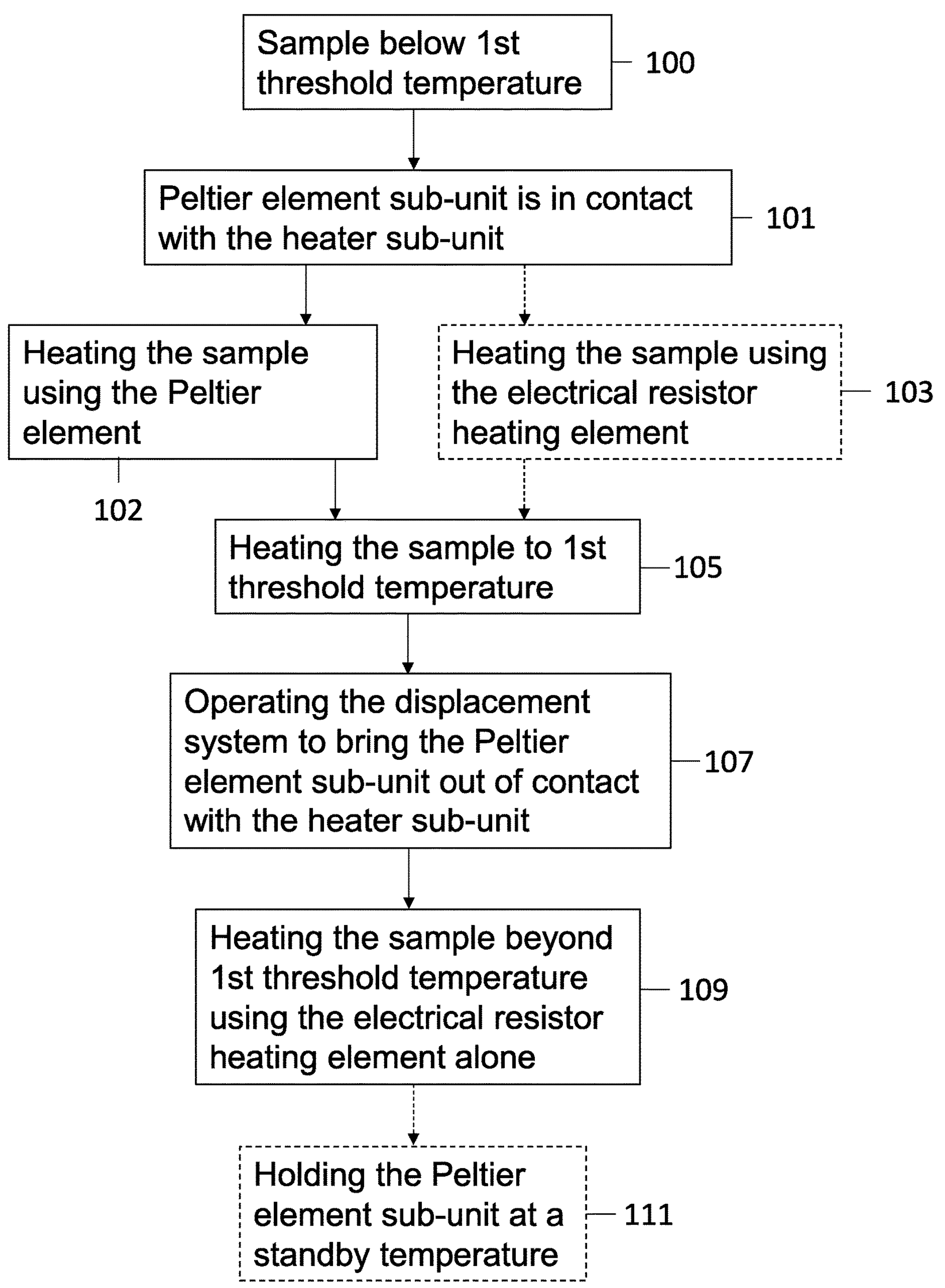
FIG. 5 shows a flow chart describing a first method of operating the temperature control system of FIG. 2.

One particular method of operating the temperature control system 10, shown in FIG. 5, is used to increase the temperature of the sample 2 from below the first threshold temperature to above the first threshold temperature. In the Figure, optional steps are shown in dashed lines. Initially, the sample is below the first threshold temperature (step 100). At temperatures below the first threshold temperature, the temperature control system 10 is in the engaged position and the Peltier element sub-unit 25 is in contact with the heater sub-unit 23 (step 101). The Peltier element 51 is used to heat the sample 2 (step 102) as it provides finer control. Optionally, the electrical resistor heating element 31 may be used in tandem (step 103) with the Peltier element 51 to provide faster heating of the sample 2. The temperature of the heater sub-unit (measured by sensor 35) increases to the first threshold temperature (step 105).

When the heater sub-unit temperature reaches the first threshold temperature, the displacement system 27 is operated to move the temperature control system 10, and the Peltier element sub-unit 25 in particular, to the disengaged position (i.e., wherein the Peltier element sub-unit 25 is out of contact with the heater sub-unit 23—step 107). Then the sample 2 is heated by the electrical resistor heating element 31 alone to heat it beyond the first threshold temperature (step 109).

After the temperature control system 10 is moved to the disengaged position, the Peltier element sub-unit 25 is held at a standby temperature, i.e., while it is out of contact with the heater sub-unit 23 (step 111). The standby temperature is less than or equal to the first threshold temperature and is a temperature at which no deterioration of the Peltier element 51 will occur, thereby preserving the Peltier element 51. However, the standby temperature is close to the first threshold temperature (within 10° C. to 30° C. of the first threshold temperature), and therefore the Peltier element sub-unit 25 is at a suitable temperature to begin control of the sample 2 when the desired temperature of the sample 2 returns to below the standby temperature. The standby temperature may be the same as the second threshold temperature. The temperature of the Peltier element sub-unit 25 is controlled using the electrical current supplied to the Peltier element 51, in addition to the Peltier element heat exchanger 59. The Peltier element temperature sensor 55 is used to provide feedback for controlling the temperature of the Peltier element sub-unit.

Figure 6:
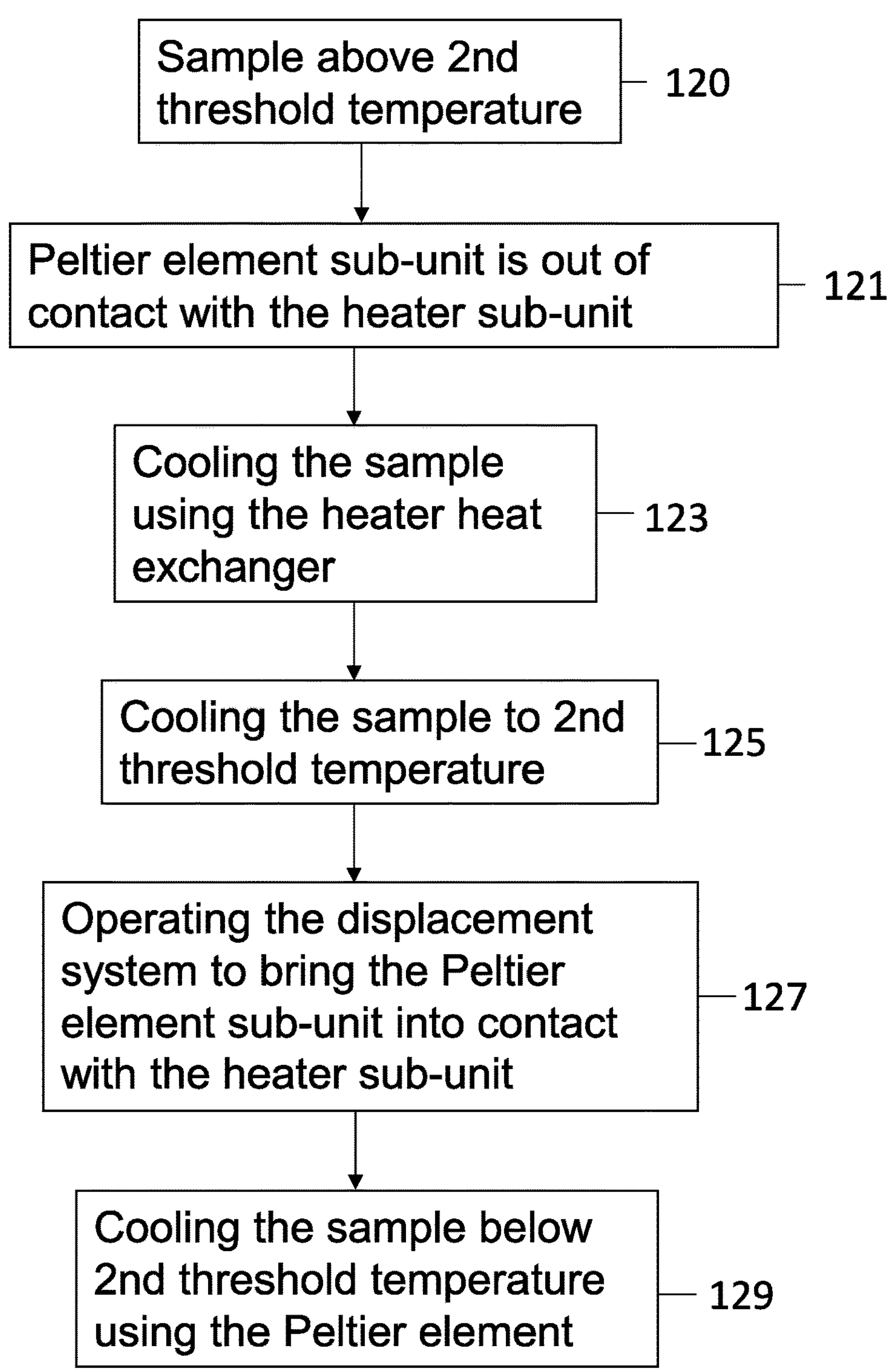
FIG. 6 shows a flow chart describing a second method of operating the temperature control system of FIG. 2.

A further method of operating the temperature control system 10, shown in FIG. 6, is used to decrease the temperature of the sample 2 from above the second threshold temperature to below the second threshold temperature. Initially, the temperature of the heater sub-unit 23 is above the second threshold temperature (step 120). At temperatures above the second threshold temperature, the temperature control system 10 is in the disengaged position and the Peltier element sub-unit 25 is out of contact with the heater sub-unit 23 (step 121). The heater heat exchanger 37 is used to cool the sample 2 (step 123) at this point. The temperature of the heater sub-unit 23 is decreased to the second threshold temperature (step 125).

When the temperature of the heater sub-unit 23 reaches the second threshold temperature, the displacement system 27 is operated to move the temperature control system 10, and the Peltier element sub-unit 25 in particular, to the engaged position (i.e., wherein the Peltier element sub-unit 25 is in contact with the heater sub-unit 23—step 127). Then the sample 2 is cooled further, below the second threshold temperature by the Peltier element 51 (step 129), since this provides finer control at these temperatures. Alternatively, the displacement system 27 may not be operated to move the temperature control system 10, to the engaged position until the sample 2 reaches the standby temperature.

The invention claimed is:

1. A temperature control system for a rheometer or a viscometer, the temperature control system comprising:

a heater sub-unit comprising at least an electrical resistor heating element;

a Peltier element sub-unit comprising at least a Peltier element and a temperature sensor for measuring a temperature of at least a part of the Peltier element sub-unit; and a displacement system arranged to bring the Peltier element sub-unit into and out of contact with the heater sub-unit.

2. The temperature control system of claim 1, wherein the heater sub-unit further comprise at least one temperature sensor for measuring the temperature of at least a part of the heater sub-unit.

3. The temperature control system of claim 1, wherein the displacement system is arranged to bring the Peltier element sub-unit into and out of contact with the heater sub-unit based on at least one or more of:

a temperature of the Peltier element sub-unit;

a temperature of the heater sub-unit; and a temperature of a sample.

4. The temperature control system of claim 1, wherein the each of heater sub-unit and the Peltier element sub-unit further comprise at least one heat exchanger for removing heat from the sub-unit.

5. The temperature control system of claim 4, wherein the at least one heat exchanger comprises one or more of: a liquid heat sink, a gas cooled heat sink, cooling fins, and a fan.

6. The temperature control system of claim 4, wherein the heat exchanger of the heater sub-unit is positioned between the electrical resistor heating element and the Peltier element.

7. The temperature control system of claim 1, wherein the heater sub-unit includes a first thermally conductive material in thermal contact with the electrical resistor heating element, and the Peltier element sub-unit includes a second thermally conductive material in thermal contact with the Peltier element and bringing the Peltier element sub-unit into and out of contact with the heater sub-unit includes bringing the first thermally conductive material into and out of contact with the second thermally conductive material.

8. The temperature control system of claim 1, wherein a first surface of the heater sub-unit is arranged to be proximal to a sample, and a distance between a second surface of the heater sub-unit and the Peltier element sub-unit is adjustable under the action of the displacement system.

9. The temperature control system of claim 1, wherein the displacement system is configured to separate the sub-units such that there is a gap of at least 1 mm between the heater sub-unit and the Peltier element sub-unit in response to the temperature of the Peltier element sub-unit being greater than a threshold temperature.

10. The temperature control system of claim 1, wherein the displacement system brings the Peltier element sub-unit into and out of contact with the heater sub-unit via a displacement actuator or displacement caused by thermal expansion or contraction.

11. The temperature control system of claim 1, further comprising a controller, wherein the controller is arranged to control a sample temperature by adjusting one or more of the electrical resistor heating element, the Peltier element, the displacement system, and the heat exchangers.

12. The temperature control system of claim 11, wherein the controller is arranged to receive data from the at least one temperature sensor as a control input.

13. A system for measuring rheological properties of a sample, comprising:

a deformation actuator;

a measuring device arranged for measuring a force and/or torque applied to the sample and a deformation of the sample;

a rotor;

a stator; and the temperature control system of claim 1, wherein:

the deformation actuator is configured to move the rotor relative to the stator for deforming the sample positioned between the rotor and the stator.

14. The temperature control system of claim 1, wherein the temperature sensor provides feedback for controlling the Peltier element sub-unit to maintain the Peltier element sub-unit at a standby temperature when the Peltier element sub-unit is out of contact with the heater sub-unit.

15. A method of controlling a temperature of a sample analysed by a rheometer or viscometer, comprising:

loading the sample to the rheometer or viscometer;

adjusting the temperature of the sample with one or both of:

a heater sub-unit comprising at least an electrical resistor heating element; and a Peltier element sub-unit including at least a Peltier element; and responsive to a temperature of the heater sub-unit, operating a displacement system to bring the Peltier element sub-unit into and out of contact with the heater sub-unit, wherein the method further comprises a first operating mode in which:

at the temperature of the sample below a first threshold temperature, the displacement system is operated to bring the Peltier element sub-unit in contact with the heater sub-unit and heat the sample with the Peltier element sub-unit; and responsive to the temperature of the sample is increased from below the first threshold temperature to above the first threshold temperature, the displacement system is operated to bring the Peltier element sub-unit out of contact with the heater sub-unit.

16. The method of claim 15, wherein in the first operating mode the method further comprises holding the Peltier element sub-unit at a standby temperature when it is not in contact with the heater sub-unit, wherein the standby temperature is less than or equal to the first threshold temperature.

17. The method of claim 15, wherein the method comprises a second operating mode in which:

the temperature of the sample is decreased from above a second threshold temperature to below the second threshold temperature; and the displacement system is operated to bring the Peltier element sub-unit into contact with the heater sub-unit.

18. The method of claim 17, wherein the second threshold temperature is the same as a standby temperature.

19. The method of claim 15, wherein the method comprises a third operating mode in which the temperature of the sample is increased from a first temperature to a second temperature below the first threshold temperature, wherein the temperature of the sample is increased using both the electrical resistor heating element and the Peltier element.

* * * * *